(12) United States Patent
Udagawa

(10) Patent No.: US 6,250,645 B1
(45) Date of Patent: Jun. 26, 2001

(54) GASKET WITH ANNULAR SEALING PROJECTION AND GROOVE

(75) Inventor: Tsunekazu Udagawa, Ichikawa (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 09/693,977

(22) Filed: Oct. 23, 2000

Related U.S. Application Data

(62) Division of application No. 09/204,350, filed on Dec. 4, 1998, now Pat. No. 6,186,513.

(30) Foreign Application Priority Data

Jan. 12, 1998 (JP) .................................................. 10-016314

(51) Int. Cl.⁷ .................................................. F02F 11/00
(52) U.S. Cl. .......................... 277/595; 277/592; 277/593
(58) Field of Search ................................ 277/593, 595, 277/592

(56) References Cited

U.S. PATENT DOCUMENTS 5,879,012 * 3/1999 Udagawa .............................. 277/595
5,988,651 * 11/1999 Miyaoh ................................ 277/595

* cited by examiner

Primary Examiner—Chuck Y. Mah
Assistant Examiner—Enoch E. Peavey
(74) Attorney, Agent, or Firm—Kanesaka & Takeuchi

(57) ABSTRACT

A metal gasket is formed of a metal plate having a hole, an edge portion around the hole, and a base portion extending substantially throughout an entire area of the gasket and located outside the edge portion. At least one annular projection and at least one annular groove are formed on at least one side of the edge portion of the metal plate as one unit. The annular groove is located between the annular projection and the base portion. The base portion of the metal plate has a thickness greater than a thickness at the annular groove and less than a thickness at the annular projection to thereby provide a surface pressure at the at least one annular projection.

6 Claims, 2 Drawing Sheets

GASKET WITH ANNULAR SEALING PROJECTION AND GROOVE

This application is a Div of Ser. No. 09/204,350 filed Dec. 4, 1998, now U.S. Pat. No. 6,186,513.

BACKGROUND OF THE INVENTION AND RELATED ART STATEMENT

The present invention relates to a gasket with an annular sealing projection and a sealing groove formed around a hole to be sealed.

In a conventional gasket, in order to seal around a hole, such as a cylinder bore, water hole, oil hole and so on, various sealing devices have been used. A bead is often formed around the hole to provide a surface pressure thereat. However, if only a bead is formed around the hole, a fluid in the hole may pass over the bead due to change of the surface pressure at the bead.

Therefore, in addition to or separately from the bead, a plate for the gasket may be turned around a hole to be sealed to provide a surface pressure around the hole. However, since a part of the metal plate is turned, the thickness of the gasket is increased at the turned portion. This is not preferable when a thin gasket is required. Especially, in case a gasket is formed of one metal plate, the turned portion is not preferable.

Also, a shim may be formed on a metal plate around a hole to be sealed, such as disclosed in U.S. Pat. No. 4,776,073. In this case, the shim with a proper thickness is selected, and attached onto the metal plate by welding and so on. Therefore, it takes time and labor when the shim is used. Also, it is difficult to attach a thin shim on the metal plate.

In Japanese Patent Publication (KOKAI) No. 7-91548, a gasket has a thick portion and a groove around a hole to be sealed. However, the thick portion is not ideally arranged to properly seal around the hole. Also, when the thick portion is formed, the metal plate is excessively processed, so that the plate to be used is limited.

In view of the above, the present invention has been made, and an object of the invention is to provide a thin metal gasket, which can provide a non-resilient surface pressure around a hole to be sealed.

Another object of the invention is to provide a thin metal gasket as stated above, wherein the surface pressure around the hole can be selected as desired.

A further object of the invention is to provide a thin metal gasket as stated above, which can be manufactured easily without substantial limitation for the metal plate.

Further objects and advantages of the invention will be apparent from the following description of the invention.

SUMMARY OF THE INVENTION

A metal gasket of the invention is basically formed of one metal plate. If desired, however, one or more metal plate may be laminated on the one metal plate to form a metal laminate gasket. The gasket is preferably used for an internal combustion engine, such as cylinder head gasket, but the gasket may be used for other purposes.

The metal plate includes a hole, an edge portion around the hole, and a base portion extending substantially throughout an entire area of the gasket outside the edge portion. At least one annular projection and at least one annular groove are integrally formed on at least one side of the edge portion of the metal plate as one unit. The annular groove is located between the annular projection and the base portion.

The metal plate has a thickness greater than a thickness at the annular groove and less than a thickness at the annular projection. Therefore, when the gasket is installed between the parts to be sealed and is tightened, the annular projection is non-resiliently compressed to provide a surface pressure thereat to thereby securely seal around the hole.

Since the annular projection is integrally formed with the metal plate for forming the gasket, the gasket with the projection can be formed easily. Also, the thickness of the projection can be adjusted easily as required. Further, since the surface pressure is concentrated at the annular projection when the gasket is tightened, the hole can be sealed securely and reliably.

The annular projection and annular groove may be formed on two sides of the edge portion of the metal plate, respectively. The annular projections and the annular grooves formed on both sides of the metal plate may be symmetrically arranged relative to a center plane of the metal plate. On the other hand, the annular projections formed on both sides of the metal plate may be located at a side opposite to the annular grooves, respectively. Namely, the annular projections and the grooves on both sides of the metal plate are arranged in a staggered relation.

The metal plate may further include a bead formed on the base portion to surround the hole. The bead projects outwardly beyond the upper surface of the projection. Thus, when the gasket is tightened, the bead is compressed to the height of the annular projection without being completely flattened. Therefore, creep relaxation of the bead is prevented or reduced by the annular projection.

The metal plate with the annular projection and the annular groove may be laminated on another metal plate, or may be formed in a clad metal plate. In this case, the another metal plate is laminated on the metal plate at a side where the annular projection and annular groove are not formed. Preferably, the metal plate is formed of a soft metal plate or layer, and the another metal plate is formed of a hard metal plate harder than the soft metal plate.

When the metal gasket is formed, a metal plate is prepared to have a hole, an edge portion around the hole, and a base portion extending substantially throughout an entire area of the gasket and located outside the edge portion. Then, at least two annular grooves substantially parallel to each other are formed on at least one side of the edge portion of the first metal plate by coining process to thereby form an annular projection between the two annular grooves. The base portion has a thickness greater than a thickness at the annular grooves and less than a thickness at the annular projection. The edge portion along the annular projection at a side of the hole, i.e. inner groove portion, may be cut to remove the groove adjacent the hole.

DETAILED DESCRIPTION OF PREFERRED EMBODIMENTS

The present invention will be explained with reference to the accompanied drawings.

Figure 1:
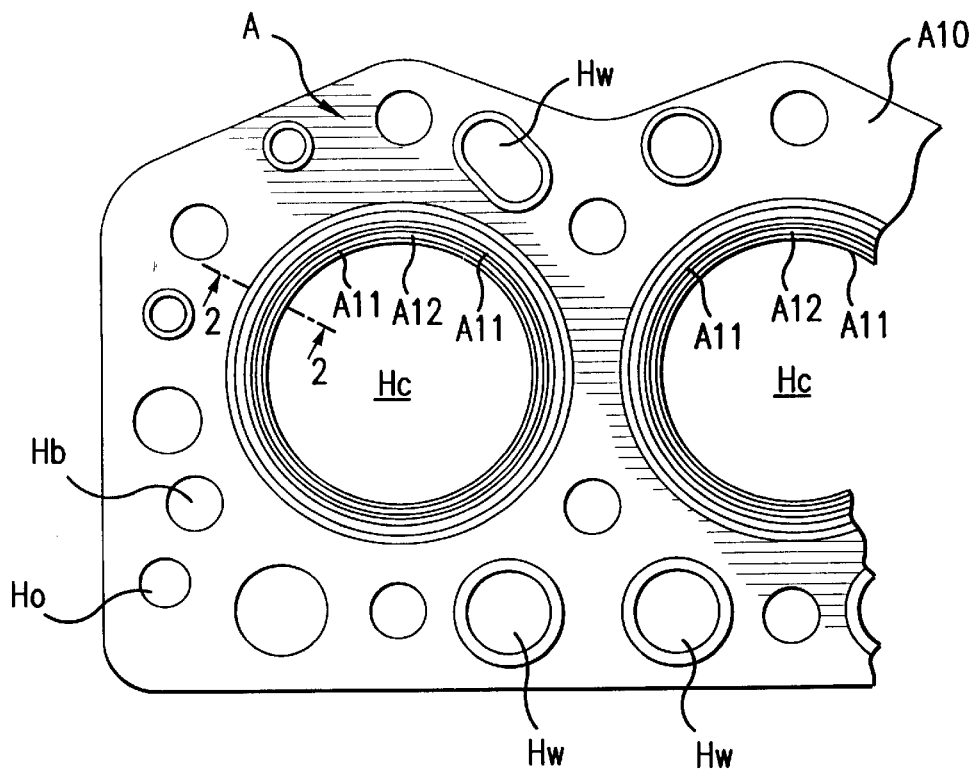
FIG. 1 is a partial plan view of a first embodiment of a metal gasket of the invention.
Figure 2:
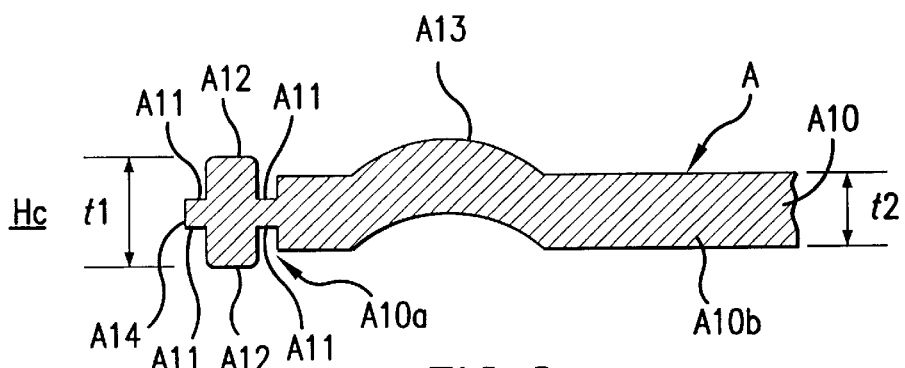
FIG. 2 is an enlarged sectional view taken along line 2—2 in FIG. 1.

FIGS. 1 and 2 show a first embodiment A of the gasket. The gasket is a cylinder head gasket used for an internal combustion engine. The gasket A includes a plurality of cylinder bores Hc, water holes Hw, oil holes Ho, and so on, as in the conventional gasket. Since the features of the invention reside in the sealing structure around the cylinder bore Hc, the structure around the cylinder bore Hc is only explained. Any desirable sealing structure may be used for other holes.

The gasket A is formed of one metal plate A10, which includes an edge portion A10a around the cylinder bore Hc, and a base portion A10b extending throughout the entire area of the gasket. As shown in FIG. 2, the metal plate A10 includes, on each side of the edge portion A10a, two grooves A11 and a projection A12 between the grooves A11 to surround the cylinder bore Hc. The grooves A11 are concentrically formed relative to the cylinder bore Hc, so that the width of the projection A12 is substantially constant throughout the entire length thereof. Also, a bead A13 is formed in the base portion A10b to surround the cylinder bore Hc.

The projection A12 has a flat top surface to smoothly contact a cylinder head or a cylinder block (not shown) when it is installed in the engine. The thickness t1 between the outer surfaces of the projections A12 is greater than the thickness t2 of the metal plate A10 to concentrate the surface pressure thereat when the gasket is tightened.

The projection A12 is made by forming the two grooves A11 on both sides thereof by coining process. In particular, an original metal plate for the gasket A is flat with a constant thickness. The original metal plate is cut along an outer shape of the gasket, and various holes are formed by a punch. Then, two grooves A11 are formed on each side of the metal plate by coining process to thereby form the projection A12 between the two grooves A11. Namely, the grooves A11 and projections A12 on both sides are formed simultaneously.

The thickness at the projections A12 is formed to be greater than the thickness of the base portion A10b of the metal plate A10. Namely, both outer surfaces of the projections A12 project outwardly, i.e. upwardly and downwardly, beyond the outer surfaces of the base portion A10b of the metal plate A10.

After the grooves A11 and projections A12 are formed, the bead A13 is formed. On the other hand, the bead A13 may be formed at the same time or before the grooves A11 and projections A12 are formed on the metal plate. The top portion of the bead A13 is formed to project upwardly beyond the upper surface of the projection A12 on the upper side.

When the gasket A thus formed is situated between the cylinder head and the cylinder block and is tightened, the bead A13 is compressed to the height of the projection A12. Since the bead A13 is not completely flattened by the upper projection A12, creep relaxation of the bead A13 is reduced or prevented. In this respect, the upper projection A12 operates as a surface pressure regulating portion for the bead A13. Also, the projections A12 are securely tightened between the cylinder head and the cylinder block, and provide the non-compressible surface pressures thereat. The gasket A can seal around the cylinder bore Hc non-compressively by the projections A12 and resiliently by the bead A13 to thereby securely seal around the cylinder bore Hc.

In the gasket A, the height of the projections A12 can be set precisely and easily by coining process such that the outer surfaces of the projections are slightly higher than the outer surfaces of the base portion A10b. The cylinder bore Hc can be securely sealed by the projections A12 and the bead A13.

Also, since the projections A12 and grooves A11 are arranged symmetrically relative to the center plane of the metal plate A10, the gasket A can withstand a large tightening pressure without deformation.

Figure 3:
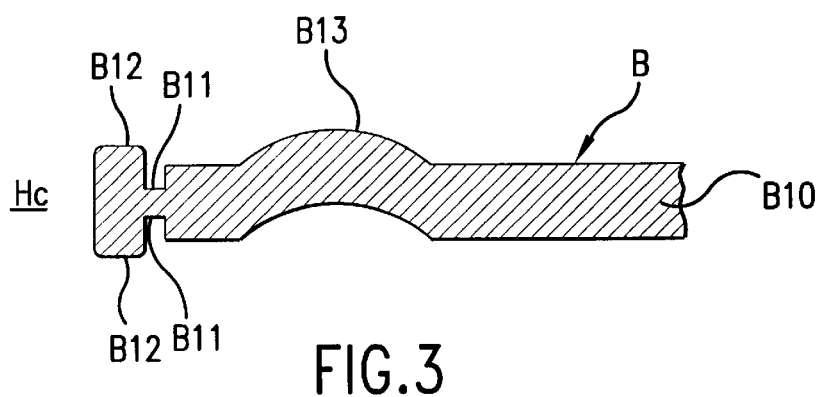
FIGS. 3–7 are enlarged sectional views, similar to FIG. 2, of second to sixth embodiments of the metal gaskets of the invention.

FIG. 3 show a second embodiment B of a metal gasket of the invention. The gasket B includes one projection B12 and one groove B11 on each side of a metal plate B10, and a bead B13 is formed in the metal plate B10. Namely, an inner protrusion A14 between the grooves A11 as shown in FIG. 2 is not formed in the gasket B. In the gasket B, after the gasket A is formed, the inner protrusion A14 is cut. The gasket B operates as in the gasket A.

Figure 4:
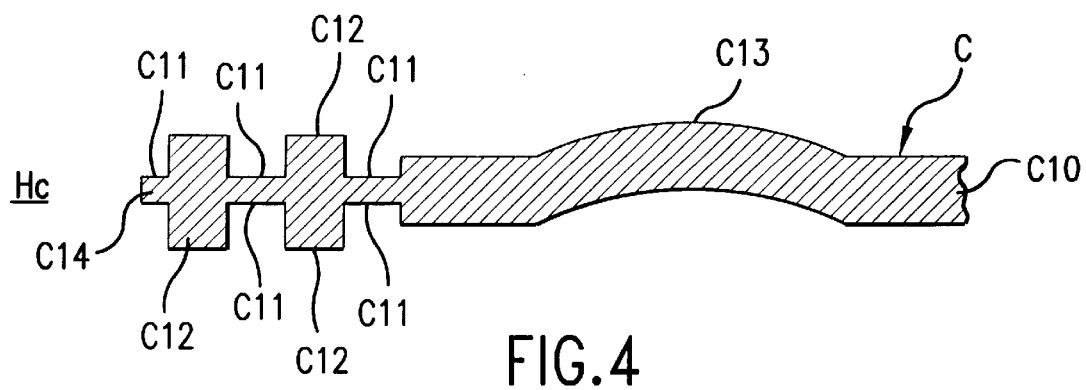

FIG. 4 shows a third embodiment C of a metal gasket of the invention. The gasket C includes two projections C12 and three grooves C11 on each side of a metal plate C10, and also, a bead C13 and an inner protrusion C14 are formed in the metal plate C10. Since two projections C12 with one groove C11 therebetween are formed on each side of the metal plate C10, the cylinder bore Hc can be sealed more securely and reliably. The gasket C operates as in the gasket A.

Figure 5:
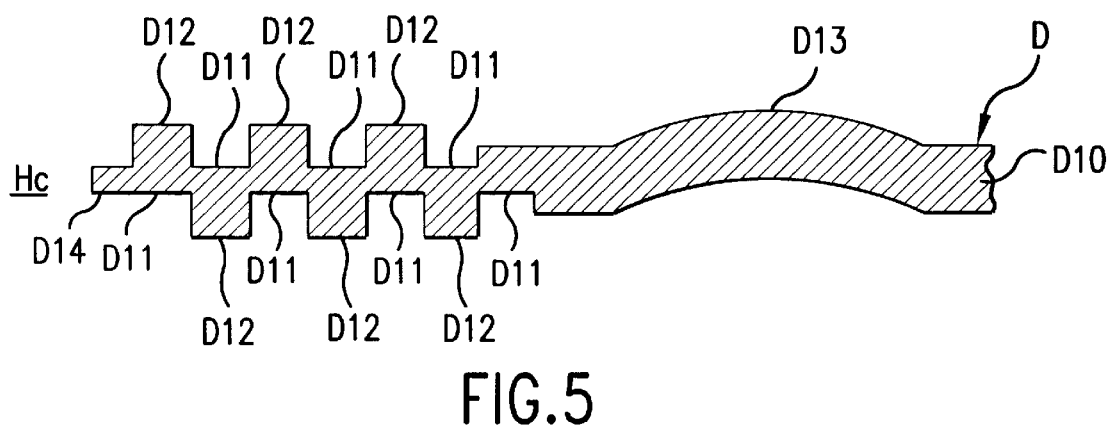

FIG. 5 shows a fourth embodiment D of a metal gasket of the invention. The gasket D includes three projections D12 and four grooves D11 on each side of a metal plate D10, and a bead D13 and an inner protrusion D14 are formed in the metal plate D10. In the gasket D, the projections D12 on one side of the metal plate D10 are located at the opposite side of the grooves D11 formed on the other side of the metal plate D10. Since the projections D12 on both sides of the metal plate D10 are not symmetrically arranged relative to the center of the plate D10, when the gasket D is tightened, the projections D12 can be slightly compressed to the other side. Thus, even if the gasket attaching portions, e.g. cylinder head and cylinder block, have slight projections or dents, the gasket can easily conform to the projections or dents. The gasket D operates substantially the same as in the gasket C, and can securely seal around the hole.

Figure 6:
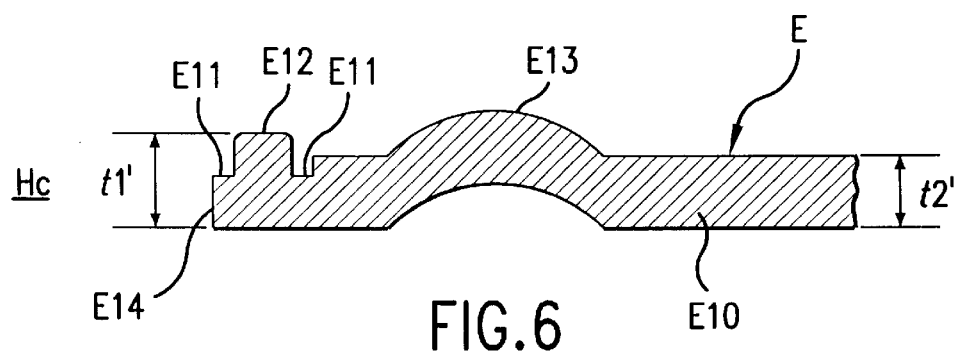

FIG. 6 shows a fifth embodiment E of a metal gasket of the invention. The gasket E includes one projection E12 and two grooves E11 on one side of a metal plate E10, and a bead E13 and an inner projection E14 are formed on the metal plate E10. Namely, although the gasket A has one projection and two grooves on both sides of the metal plate, the gasket E includes only one projection E12 and two grooves E11 on one side of the metal plate E10. The thickness t1' at the projection E12 is thicker than the thickness t2' of the metal plate E10. The gasket E is formed in the same manner as in the gasket A and operates as in the gasket A. The gasket E is useful when the gasket E is combined with other metal plate to constitute a metal laminate gasket.

Figure 7:
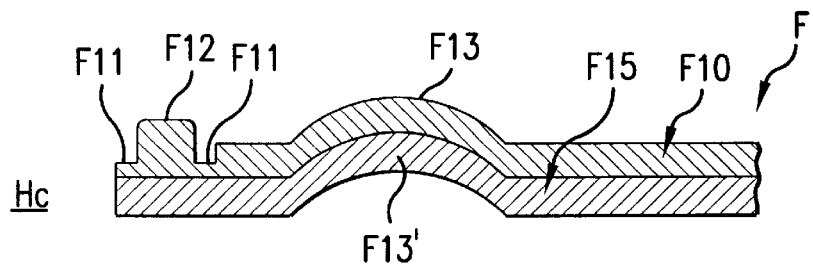

FIG. 7 shows a sixth embodiment F of a metal gasket of the invention. The gasket F is formed of a clad plate including a hard base metal plate F15, such as stainless steel plate, and a soft upper metal layer or plate F10, such as aluminum, capper and zinc layer covering the base metal plate F15. One projection F12 and two grooves F11 are formed by coining process on the upper metal layer F10. Also, beads F13, F13' are formed integrally on the metal plate F15 and the metal layer F10. In the gasket F, since the projection and grooves are formed on the soft metal layer, the projection and the grooves can be formed easily, and can conform to the shape of the gasket attaching portion. The clad plate may be processed as in the gasket E by coining process to form the gasket F.

In the gasket F, the soft metal layer F10 is formed on the base metal plate F15, but a soft metal layer may be also formed under the base metal plate F15, to which a projection and grooves may be formed.

In the above embodiments, at least one projection and at least one groove are formed on at least one side of one metal plate or clad metal plate. However, the metal plate with the projection and groove may be combined with one or more metal plate to constitute a metal laminate gasket. In this case, the projection may contact directly the engine part or through a metal plate constituting the metal laminate gasket. Also, in this case, the projection and groove are formed on one metal plate, and a bead surrounding the projection and groove may be formed on another metal plate.

Further, in the above embodiments, the groove has a rectangular shape. However, the groove may have a U-shape or V-shape. As a result, the projection may have a trapezoidal shape. The sizes of the groove and the projection are selected as desired.

In the present invention, the two grooves are formed in the metal plate at the sealing section around the hole by coining process so that the projection higher than the thickness of the metal plate is formed between the two grooves. The width of the projection is generally constant. Accordingly, the projection can be formed relatively easily around the hole by coining process. Thus, the gasket can be manufactured relatively easily, and the hole can be sealed reliably.

While the invention has been explained with reference to the specific embodiments of the invention, the explanation is illustrative and the invention is limited only by the appended claims.

What is claimed is:

1. A metal gasket comprising:

a metal plate having a hole, an edge portion around the hole, and a base portion extending substantially throughout an entire area of the gasket and located outside the edge portion, at least one first annular projection and at least one first annular groove formed on one side of the edge portion of the metal plate, said at least one first annular groove being located between the at least one first annular projection and the base portion, and at least one second annular projection and at least one second annular groove formed on the other side of the edge portion of the metal plate and arranged symmetrically to the at least one first annular projection and at least one first annular groove relative to a center plane of the metal plate, the base portion having a thickness greater than a thickness between the first and second annular grooves and less than a thickness between the first and second annular projections to thereby provide a surface pressure at the first and second annular projections.

2. A metal gasket according to claim 1, wherein a plurality of first and second annular grooves and annular projections are formed on both sides of the metal plate.

3. A metal gasket according to claim 1, wherein said metal plate further includes a bead formed on the base portion to surround the hole and projecting upwardly beyond the at least one first annular projection so that when the gasket is tightened, the bead is compressed upto the first annular projection without being completely flattened.

4. A metal gasket comprising:

a metal plate having a hole, an edge portion around the hole, and a base portion extending substantially throughout an entire area of the gasket and located outside the edge portion, at least one first annular projection projecting outwardly beyond a first outer surface of the base portion, and at least one first annular groove, both being formed on one side of the edge portion of the metal plate, said at least one first annular groove being located between the at least one first annular projection and the base portion, and at least one second annular projection projecting outwardly beyond a second outer surface of the base portion, and at least one second annular groove, both being formed on the other side of the edge portion of the metal plate and arranged such that the at least one second annular projection and the at least one second annular groove are located at a side opposite to the at least one first annular groove and the at least one first annular projection, respectively.

5. A metal gasket according to claim 4, wherein a plurality of first and second annular grooves and annular projections are formed on both sides of the metal plate.

6. A metal gasket according to claim 5, wherein said metal plate further includes a bead formed on the base portion to surround the hole and projecting upwardly beyond the at least one first annular projection so that when the gasket is tightened, the bead is compressed upto the first annular projection without being completely flattened.

* * * * *